(12) United States Patent
Endo et al.

(10) Patent No.: US 9,018,895 B2
(45) Date of Patent: Apr. 28, 2015

(54) MOTOR VEHICLE AND CONTROL METHOD THEREOF

(75) Inventors: Hiroki Endo, Toyota (JP); Masaya Yamamoto, Kasugai (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 819 days.

(21) Appl. No.: 13/263,672

(22) PCT Filed: Apr. 10, 2009

(86) PCT No.: PCT/JP2009/057331
§ 371 (c)(1),
(2), (4) Date: Oct. 7, 2011

(87) PCT Pub. No.: WO2010/116521
PCT Pub. Date: Oct. 14, 2010

(65) Prior Publication Data
US 2012/0038326 A1 Feb. 16, 2012

(51) Int. Cl.
| | |
|---|---|
| H02J 7/00 | (2006.01) |
| B60K 6/445 | (2007.10) |
| B60L 1/00 | (2006.01) |
| B60L 3/00 | (2006.01) |
| B60L 11/18 | (2006.01) |
| B60W 10/26 | (2006.01) |
| B60W 10/30 | (2006.01) |
| B60W 20/00 | (2006.01) |

(52) U.S. Cl.
CPC ............... *B60K 6/445* (2013.01); *B60L 1/003* (2013.01); *B60L 3/0046* (2013.01); *B60L 11/1816* (2013.01); *B60L 11/1861* (2013.01); *B60W 10/26* (2013.01); *B60W 10/30* (2013.01); *B60W 20/00* (2013.01); *Y02T 10/6239* (2013.01); *Y02T 10/7005* (2013.01); *Y02T 10/7044* (2013.01); *Y02T 10/705* (2013.01); *Y02T 10/7088* (2013.01); *Y02T 90/121* (2013.01); *Y02T 90/14* (2013.01)

(58) Field of Classification Search
USPC .................. 320/111, 130, 132, 134, 162, 104
See application file for complete search history.

(56) References Cited

U.S. PATENT DOCUMENTS

| | | | | |
|---|---|---|---|---|
| 2002/0171399 | A1* | 11/2002 | Kitagawa | 320/134 |
| 2006/0001403 | A1* | 1/2006 | Yudahira | 320/134 |

(Continued)

FOREIGN PATENT DOCUMENTS

| | | |
|---|---|---|
| CN | 200947551 Y | 9/2007 |
| JP | 7-212902 A | 8/1995 |
| JP | 9-301021 A | 11/1997 |
| JP | 2000-078701 A | 3/2000 |
| JP | 2001-063347 A | 3/2001 |

(Continued)

OTHER PUBLICATIONS

International Search Report mailed Jun. 16, 2009.

*Primary Examiner* — Drew A Dunn
*Assistant Examiner* — Nathaniel Pelton
(74) *Attorney, Agent, or Firm* — Kenyon & Kenyon LLP

(57) ABSTRACT

In the case that an auxiliary such as the air conditioner is operated with electric power from the commercial power supply by controlling the charger prior to the system startup and the inter-terminal voltage of the battery is more than or equal to the threshold value Vref that is a voltage where there is a possibility of overcharging the battery when the battery is charged, the supply voltage of the electric power supplied from the charger is set to the voltage that is a little smaller than the threshold value, and the auxiliary is operated with the electric power from the battery and the electric power from the charger. This arrangement enables to prevent overcharging the battery and to operate the auxiliary in the case that an auxiliary such as the air conditioner is operated with electric power from the commercial power supply by controlling the charger prior to the system startup.

7 Claims, 4 Drawing Sheets

(56) References Cited

U.S. PATENT DOCUMENTS

2009/0021221 A1* 1/2009 Krauer et al. ............... 320/153
2009/0058366 A1* 3/2009 Masuda ...................... 320/135
2010/0318250 A1 12/2010 Mitsutani

FOREIGN PATENT DOCUMENTS

| JP | 2003-037903 A | 2/2003 |
| WO | 2009/034872 A1 | 3/2009 |

* cited by examiner

MOTOR VEHICLE AND CONTROL METHOD THEREOF

This is a 371 national phase application of PCT/JP2009/057331 filed 10 Apr. 2009, the contents of which are incorporated herein by reference.

TECHNICAL FIELD

The present invention relates to a motor vehicle and a control method of a motor vehicle. More specifically, the invention pertains to a vehicle having a secondary battery that is mounted on the vehicle, a motor that is connected with battery power lines where the secondary battery is connected and constructed to input and output power for driving the vehicle, and a vehicle-mounted equipment that is connected with the battery power lines, and a control method of such a motor vehicle.

BACKGROUND ART

One proposed motor vehicle, having a main battery for driving the vehicle and an auxiliaries battery for driving auxiliaries, starts charging the auxiliaries battery according to charge start of the main battery to charge the auxiliaries battery with a first desired voltage, which enables certain charge of the auxiliaries battery, from the charge start to a desired time. The proposed motor vehicle performs charging the auxiliaries battery with a second desired voltage which is lower than the first desired voltage after the desired time passes (see, for example, Patent Document 1). In this motor vehicle, it is thus enabled to charge the auxiliaries battery safely and certainly.

PRIOR ART DOCUMENT

Patent Document

Patent Document 1: Japanese Patent Laid-Open No. 2003-037903

SUMMARY OF THE INVENTION

In the motor vehicle above described, there is a case where it is required to charge the main battery together with driving the auxiliaries, such as a case where it is required to charge the main battery together with driving an air conditioner, which performs air conditioning of a cabin in the vehicle, to have the cabin in a comfortable state when a driver or a passenger ride into the cabin. In this case, the auxiliaries may not be driven when the main battery is charged with a desired voltage, and the main battery may be overcharged when driving the auxiliaries and charging the main battery are continued in a case that the main battery is in its almost fully charged state.

In a motor vehicle and a control method of a motor vehicle of the invention, the main object of the invention is to prevent overcharging a secondary battery and to drive an auxiliary equipment when the secondary battery and the auxiliary equipment are driven with electric power from an external power supply.

In order to attain the main object, the motor vehicle and the control method of the motor vehicle of the invention have the configurations discussed below.

According to one aspect, the present invention is directed to a motor vehicle. The motor vehicle, having a secondary battery that is mounted on the vehicle, a motor that is connected with battery power lines where the secondary battery is connected and constructed to input and output power for driving the vehicle, and a vehicle-mounted equipment that is connected with the battery power lines, the motor vehicle having: an external power supplying unit that is connected to an external power supply and capable of supplying electric power from the external power supply to the battery power lines; a voltage detection unit that detects an inter-terminal voltage of the secondary battery; and a control unit that controls the external power supplying unit, in a case that the detected inter-terminal voltage of the secondary battery is more than or equal to a predetermined voltage when the vehicle-mounted equipment is operated in a state that the external power supplying unit is connected to the external power supply, so that the vehicle-mounted equipment operates with electric power discharged from the secondary battery and electric power supplied by the external power supplying unit.

In the motor vehicle according to this aspect of the invention, an external power supplying unit that is capable of supplying electric power from an external power supply to battery power lines where a secondary battery is connected is controlled, in a case that an inter-terminal voltage of the secondary battery is more than or equal to a predetermined voltage when a vehicle-mounted equipment is operated in a state that the external power supplying unit is connected to the external power supply, so that the vehicle-mounted equipment operates with electric power discharged from the secondary battery and electric power supplied by the external power supplying unit. It is thus enabled to prevent overcharging the secondary battery and to operate the vehicle-mounted equipment. Here, the predetermined voltage may be predetermined as a voltage where there is a possibility of overcharging the secondary battery. The vehicle-mounted equipment may be an air conditioner that performs air conditioning of a cabin, as one example.

In one preferable application of the motor vehicle, the control unit may control the external power supplying unit, in a case that the detected inter-terminal voltage of the secondary battery is less than the predetermined voltage when the vehicle-mounted equipment is operated in the state that the external power supplying unit is connected to the external power supply, so that the secondary battery is charged and the vehicle-mounted equipment operates with the electric power supplied by the external power supplying unit. This arrangement enables to operate the vehicle-mounted equipment together with charging the secondary battery. In this arrangement, the control unit may control the external power supplying unit, in the case that the detected inter-terminal voltage of the secondary battery is more than or equal to the predetermined voltage when the vehicle-mounted equipment is operated in the state that the external power supplying unit is connected to the external power supply, so that a voltage of electric power supplied to the battery power lines becomes a voltage less than the predetermined voltage, while the control unit controlling the external power supplying unit, in the case that the detected inter-terminal voltage of the secondary battery is less than the predetermined voltage when the vehicle-mounted equipment is operated in the state that the external power supplying unit is connected to the external power supply, so that the voltage of the electric power supplied to the battery power lines becomes a voltage more than or equal to the predetermined voltage.

In another preferable application of the motor vehicle of the invention, the vehicle-mounted equipment may be operated upon setting of an operating condition, and the control unit controls the vehicle-mounted equipment not to exceed the set operating condition. This arrangement enables the vehicle-mounted equipment to be controlled not to operate exceeding the set operating condition.

In still another preferable application of the motor vehicle of the invention, may further have: a generator that is connected with the battery power lines and constructed to input and output power; and a three shaft-type power input output structure that is connected to three shafts, a driveshaft linked to an axle of the motor vehicle, an output shaft of an internal combustion engine, and a rotating shaft of the generator, and designed to input and output power to residual shaft based on powers input from and output to any two shafts among the three shafts, wherein the motor is so connected with the driveshaft as to input and output power from and to the driveshaft.

According to another aspect, the present invention is directed to a control method of a motor vehicle having a secondary battery that is mounted on the vehicle, a motor that is connected with battery power lines where the secondary battery is connected and constructed to input and output power for driving the vehicle, a vehicle-mounted equipment that is connected with the battery power lines, and an external power supplying unit that is connected to an external power supply and capable of supplying electric power from the external power supply to the battery power lines, the control method including: controlling the external power supplying unit, in a case that an inter-terminal voltage of the secondary battery is more than or equal to a predetermined voltage when the vehicle-mounted equipment is operated in a state that the external power supplying unit is connected to the external power supply, so that the vehicle-mounted equipment operates with electric power discharged from the secondary battery and electric power supplied by the external power supplying unit.

In the control method of the motor vehicle according to this aspect of the invention, an external power supplying unit that is capable of supplying electric power from an external power supply to battery power lines where a secondary battery is connected is controlled, in a case that an inter-terminal voltage of the secondary battery is more than or equal to a predetermined voltage when a vehicle-mounted equipment is operated in a state that the external power supplying unit is connected to the external power supply, so that the vehicle-mounted equipment operates with electric power discharged from the secondary battery and electric power supplied by the external power supplying unit. It is thus enabled to prevent overcharging the secondary battery and to operate the vehicle-mounted equipment. Here, the predetermined voltage may be predetermined as a voltage where there is a possibility of overcharging the secondary battery. The vehicle-mounted equipment may be an air conditioner that performs air conditioning of a cabin, as one example.

In one preferable application of the control method of the motor vehicle, the control method may control the external power supplying unit, in a case that the inter-terminal voltage of the secondary battery is less than the predetermined voltage when the vehicle-mounted equipment is operated in the state that the external power supplying unit is connected to the external power supply, so that the secondary battery is charged and the vehicle-mounted equipment operates with the electric power supplied by the external power supplying unit. This arrangement enables to operate the vehicle-mounted equipment together with charging the secondary battery.

MODES FOR CARRYING OUT THE INVENTION

One mode for carrying out the invention is discussed below as a preferred embodiment.

Figure 1:
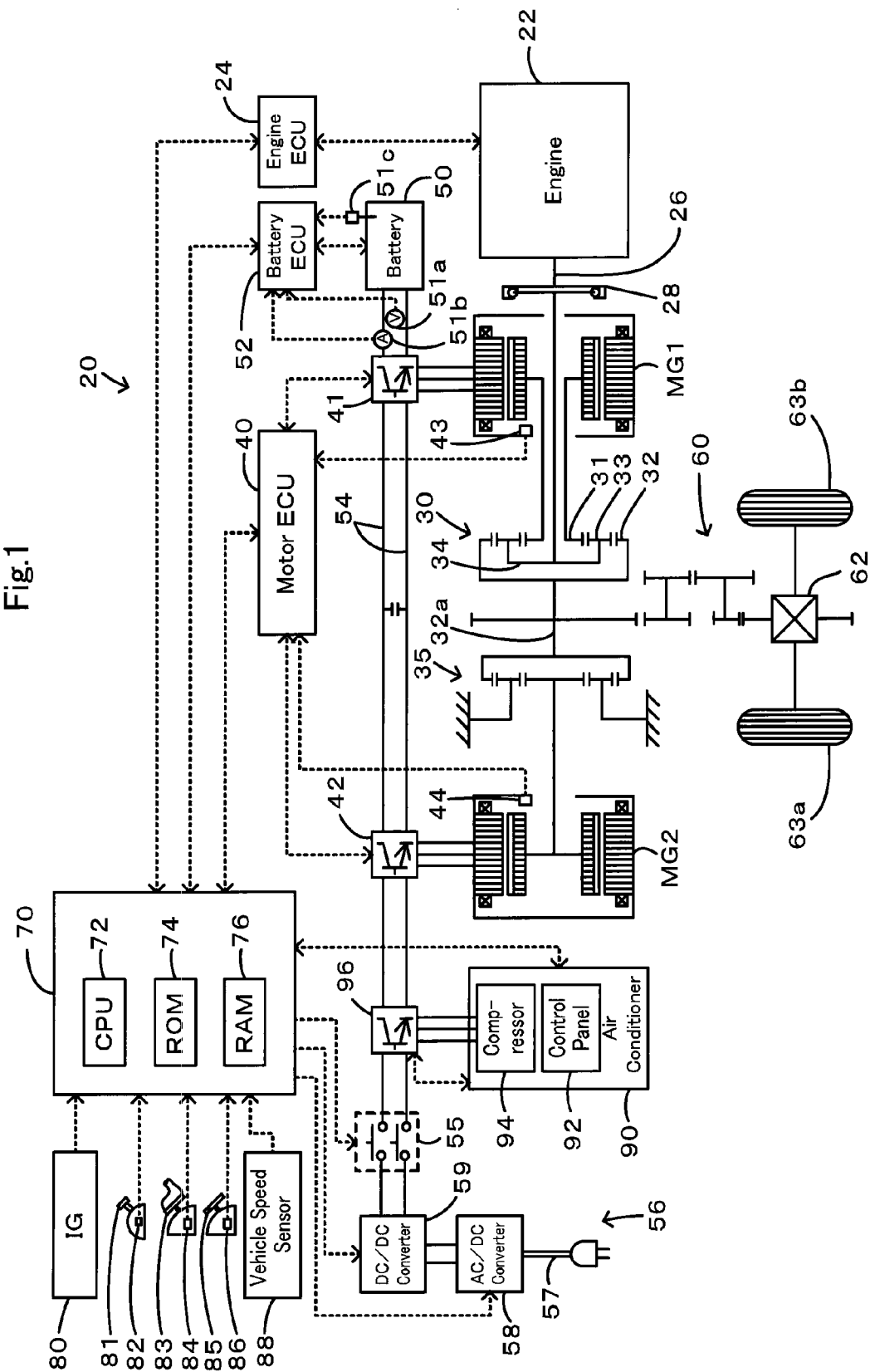
FIG. 1 schematically illustrates the configuration of a hybrid vehicle 20 in one embodiment of the invention.

FIG. 1 schematically illustrates the configuration of a hybrid vehicle 20 in one embodiment according to the invention. As illustrated, the hybrid vehicle 20 of the embodiment includes an engine 22 constructed as an internal combustion engine designed to consume a hydrocarbon fuel such as gasoline or light oil and thereby generate power, an engine electronic control unit (hereafter referred to as engine ECU) 24 configured to control the operations of the engine 22, a planetary gear 30 having a carrier 34 holding multiple pinion gears 33 and connected via a damper 28 to a crankshaft 26 or an output shaft of the engine 22 and a ring gear 32 linked with a ring gear shaft 32a or a driveshaft and connected via a gear mechanism 60 and a differential gear 62 to driving wheels 63a and 63b, a motor MG1 constructed as a synchronous motor connected to a sun gear 31 of the planetary gear 30, a motor MG2 constructed as a synchronous motor attached via a reduction gear 35 to the ring gear shaft 32a or the driveshaft, inverters 41 and 42 for driving the motors MG1 and MG2, a motor electronic control unit (hereafter referred to as motor ECU) 40 configured to drive and control the motors MG1 and MG2 by receiving signals from rotational position detection sensors 43 and 44 attached to the motors MG1 and MG2 and performing switching control of non-illustrated switching elements in the inverter 41 and 42, a battery 50 constructed in an example as a lithium-ion secondary battery designed to transmit electric power via the inverters 41 and 42 to and from the motors MG1 and MG2, a battery electronic control unit (hereafter referred to as battery ECU) 52 configured to control the battery 50, a charger 56 designed to supply electric power to power lines connected with the battery 50 using AC power from a commercial power supply, an air conditioner 90 designed to perform air conditioning of a cabin, and a hybrid electronic control unit 70 configured to control the operations of the whole hybrid vehicle 20.

The battery ECU 52 receives diverse signals required for control of the battery 50, for example, a battery voltage Vb measured by a voltage sensor 51a disposed between terminals of the battery 50, a charge-discharge current Ib measured by a current sensor 51b attached to power lines 54 connected to output terminals of the battery 50, and a battery temperature Tb measured by a temperature sensor 51c attached to the battery 50. The battery ECU 52 outputs data relating to the state of the battery 50 to the hybrid electronic control unit 70 via communication according to the requirements. The battery ECU 52 also performs various arithmetic operations for management and control of the battery 50. A remaining charge or state of charge (SOC) of the battery 50 is calculated as an electric power amount dischargeable from the battery 50 from an integrated value of the charge-discharge current Ib measured by the current sensor 51*b*. An input limit Win as an allowable charging electric power to be charged in the battery 50 and an output limit Wout as an allowable discharging electric power to be discharged from the battery 50 are set corresponding to the calculated state of charge (SOC) and the battery temperature Tb.

The charger 56 is connected via a relay 55 to the power lines 54 connected with the output terminals of the battery 50. The charger 56 includes an AC-to-DC converter 58 for conversion to DC power from the AC power supplied via a power code 57 from the commercial power supply, and a DC-to-DC converter 59 for conversion of the voltage of the DC power from the AC-to-DC converter 58 to supply the side of the power lines 54.

The air conditioner 90 includes a control panel 92 that sets an air condition of the cabin, a compressor 94 that pressurizes a heat exchange medium in air conditioning, an inverter 96 connected to the power lines 54 to drive the compressor 94, a non-illustrated air blowing fan, a non-illustrated temperature sensor that measures the temperature in the cabin, and a non-illustrated electronic control unit configured to perform switching control of the switching elements in the inverter 96 based on the input and set temperature and air volume on the control panel 92 and the temperature in the cabin measured by the temperature sensor and to drive and control the air blowing fan. The air conditioner 90 communicates with the hybrid electronic control unit 70 according to the requirements.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, a vehicle speed V from a vehicle speed sensor 88, and an outside air temperature Tout from an outside air temperature sensor that measures the temperature of outside air. The hybrid electronic control unit 70 outputs various signals via the output port: driving signals to the relay 55, switching control signals to the AC-to-DC converter 58, and switching signals to the DC-to-DC converter 59. The hybrid electronic control unit 70 communicates with the engine ECU 24, the motor ECU 40, the battery ECU 52, and the air conditioner 90 via the communication port to transmit diverse control signals and data to and from the engine ECU 24, the motor ECU 40, the battery ECU 52, and the air conditioner 90, as mentioned previously.

The hybrid vehicle 20 of the embodiment thus constructed calculates a torque demand to be output to the ring gear shaft 32*a* functioning as the drive shaft, based on observed values of a vehicle speed V and an accelerator opening Acc, which corresponds to a driver's step-on amount of the accelerator pedal 83. The engine 22 and the motors MG1 and MG2 are subjected to operation control to output a required level of power corresponding to the calculated torque demand to the ring gear shaft 32*a*. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32*a*. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32*a*, simultaneously with charge or discharge of the battery 50. The motor drive mode stops the operations of the engine 22 and drives and controls the motor MG2 to output a quantity of power equivalent to the required level of power to the ring gear shaft 32*a*. Both of the torque conversion drive mode and the charge-discharge drive mode are modes for controlling the engine 22 and the motors MG1 and MG2 to output the required level of power to the ring gear shaft 32*a* with operation of the engine 22, and a combination of the both modes is thus considered as an engine drive mode hereafter.

In the hybrid vehicle 20 of the embodiment, charge-discharge control of the battery 50 is performed during vehicle traveling to lower the state of charge (SOC) of the battery 50 to the enough extent allowing startup of the engine 22 when arriving at home or at a predetermined charging point. Upon connection of the power code 57 to the commercial power supply after system shutdown of the vehicle at home or at the predetermined charging point, the battery 50 is charged with electric power from the commercial power supply by controlling the charger 56. When system startup is performed after charging the battery 50, the hybrid vehicle 20 is driven in the setting of a motor travel priority mode where vehicle traveling with the motor drive mode (motor travel) is prioritized until the state of charge (SOC) of the battery 50 becomes less than a threshold value Shv that is predetermined to enable starting up the engine 22 adequately. After the state of charge (SOC) of the battery 50 reaches the threshold value Shv, the hybrid vehicle 20 is driven in the setting of a hybrid travel priority mode where vehicle traveling with the engine drive mode (hybrid travel) is prioritized.

In the hybrid vehicle 20 of the embodiment, a scheduled time of the next system startup of the vehicle and the set temperature in the cabin at the system startup time are input from the control panel 92 of the air conditioner 90, as a state to charge the battery 50 with electric power from the commercial power supply by controlling the charger 56, and air conditioning prior to the system startup is performed. In the air conditioning prior to the system startup, the air conditioner 90 is activated a little before the scheduled time of the system startup and the cabin is brought to the set temperature. The air conditioning prior to the system startup is used as a concrete example to describe the operations in power supply to drive a vehicle-mounted auxiliary prior to the system startup hereafter.

Figure 2:
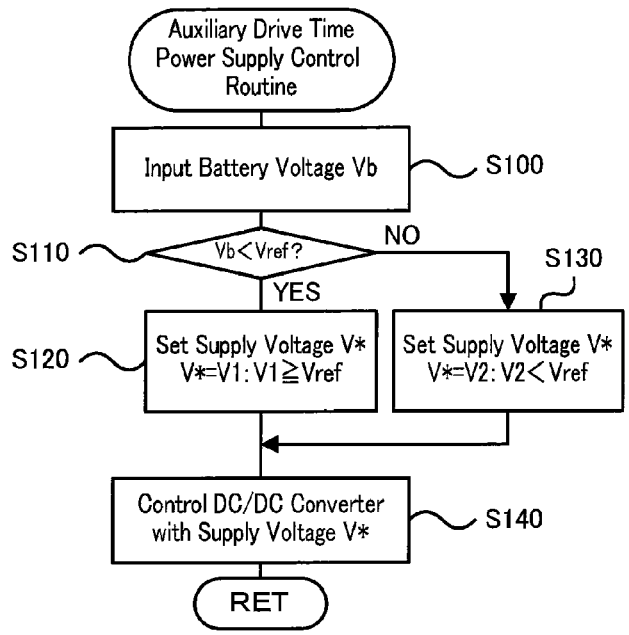
FIG. 2 is a flowchart showing an auxiliary drive time power supply control routine executed by a hybrid electronic control unit 70 when an auxiliary is driven prior to system start-up.

FIG. 2 is a flowchart showing an auxiliary drive time power supply control routine executed by the hybrid electronic control unit 70 when the auxiliary is driven prior to the system start-up. This routine is executed repeatedly at preset time intervals while the charger 56 is connected to the commercial power supply and the auxiliary is driven.

Figure 3:
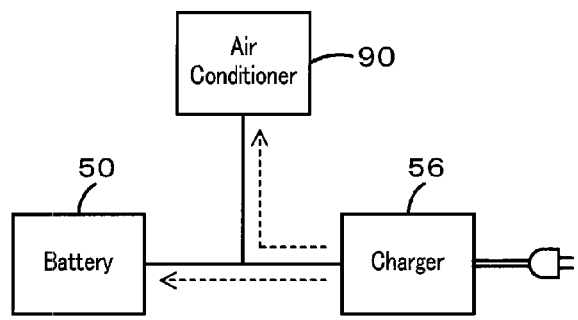
FIG. 3 shows a state where an air conditioner 90 is operated together with charging a battery 50 with electric power from a charger 56.

In the auxiliary drive time power supply control routine, the CPU 72 of the hybrid electronic control unit 70 inputs the battery voltage Vb measured by the voltage sensor 51a from the battery ECU 52 by communication (step S100), and compares the input battery voltage Vb with a threshold value Vref that is predetermined as a voltage where there is a possibility of overcharging the battery 50. In the case that the battery voltage Vb is less than the threshold value Vref, it is decided that there is no possibility of overcharging the battery 50 even when the battery 50 is charged, and a voltage V1 that is more than or equal to the threshold value Vref and appropriate to charging the battery 50 is set as a supply voltage V* of the electric power supplied to the power lines 54 from the charger 56 (step S120). The CPU 72 controls the DC-to-DC converter 59 so that the voltage in the power lines 54 becomes the supply voltage V* (step S140), and this routine is terminated. In this case, the air conditioner 90 is in operation and the electric power to charge the battery 50 and the electric power to drive the compressor 94 in the air conditioner 90 are supplied from the charger 56. The state of transferring the electric powers in this case is shown in FIG. 3.

Figure 4:
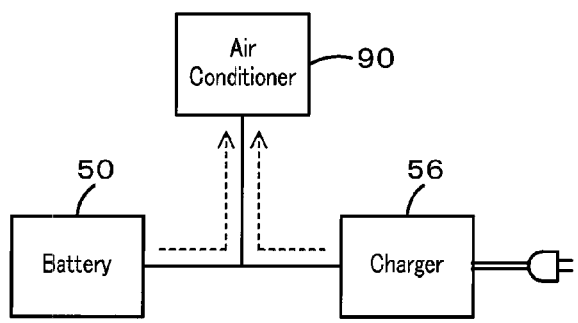
FIG. 4 shows a state where the air conditioner 90 is operated with electric power from the battery 50 and electric power from the charger 56.

In the case that the battery voltage Vb is more than or equal to the threshold value Vref, it is decided that there is a possibility of overcharging the battery 50 when the battery 50 is charged, a voltage V2 that is a little smaller than the threshold value Vref is set as the supply voltage V* of the electric power supplied to the power lines 54 from the charger 56 (step S130). The CPU 72 controls the DC-to-DC converter 59 so that the voltage in the power lines 54 becomes the supply voltage V* (step S140), and this routine is terminated. In this case, the electric power discharged from the battery 50 and the electric power supplied to the power lines 54 from the charger 56 are supplied to the compressor 94 in the air conditioner 90. The state of transferring the electric powers in this case is shown in FIG. 4.

In the hybrid vehicle 20 of the embodiment described above, in the case that an auxiliary such as the air conditioner 90 is operated with electric power from the commercial power supply by controlling the charger 56 prior to the system startup and the inter-terminal voltage (battery voltage) Vb of the battery 50 is more than or equal to the threshold value Vref that is a voltage where there is a possibility of overcharging the battery 50 when the battery 50 is charged, the supply voltage V* of the electric power supplied to the power lines 54 from the charger 56 is set to the voltage V2 that is a little smaller than the threshold value Vref. This arrangement enables to drive the auxiliary with the electric power from the battery 50 and the electric power from the charger 56. Therefore, in the case that the auxiliary such as the air conditioner 90 is operated with the electric power from the charger 56 prior to the system startup, it is enabled to prevent overcharging the battery 50 and to operate the auxiliary. In addition, in the case the auxiliary such as the air conditioner 90 is operated with the electric power from the charger 56 prior to the system startup and the battery voltage Vb is less than the threshold value Vref, the supply voltage V* of the electric power supplied to the power lines 54 from the charger 56 is set to the voltage V1 that is more than or equal to the threshold value Vref. This arrangement enables to drive the auxiliary together with charging the battery 50 with the electric power from the charger 56.

In the hybrid vehicle 20 of the embodiment described above, in the case that the auxiliary such as the air conditioner 90 is operated with the electric power from the charger 56 prior to the system startup, the supply voltage V* of the electric power supplied to the power lines 54 from the charger 56 is set to the voltage V2 that is a little smaller than the threshold value Vref when the battery voltage Vb is more than or equal to the threshold value Vref, and the supply voltage V* of the electric power supplied to the power lines 54 from the charger 56 is set to the voltage V1 that is more than or equal to the threshold value Vref when the battery voltage Vb is less than the threshold value Vref. This is not essential. In addition to this arrangement, the auxiliary may be controlled to be driven within the range of the setting of the auxiliary so that the electric power from the charger 56 do not exceed an allowable electric power, or the electric power from the charger 56 and the electric power from the battery 50 are consumed. Namely, the consumed power in the auxiliary may be regulated.

In the hybrid vehicle 20 of the embodiment, in the case that the auxiliary such as the air conditioner 90 is operated with the electric power from the charger 56 prior to the system startup and the battery voltage Vb is less than the threshold value Vref, the supply voltage V* of the electric power supplied to the power lines 54 from the charger 56 is set to the voltage V1 that is more than or equal to the threshold value Vref to operate the auxiliary together with charging the battery 50. This is not essential. In this case, the operation of the auxiliary may be stopped to prioritize charge of the battery 50, or the auxiliary may be operated without charging the battery 50.

Figure 5:
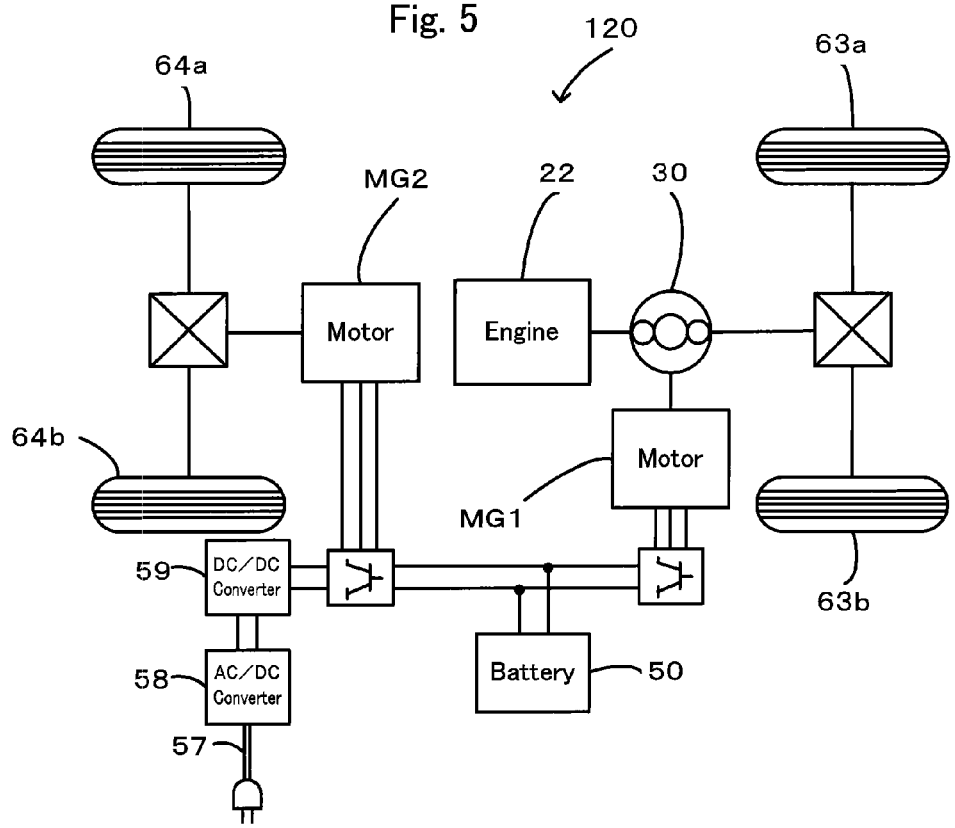
FIG. 5 schematically illustrates the configuration of another hybrid vehicle 120 in one modified example.
Figure 6:
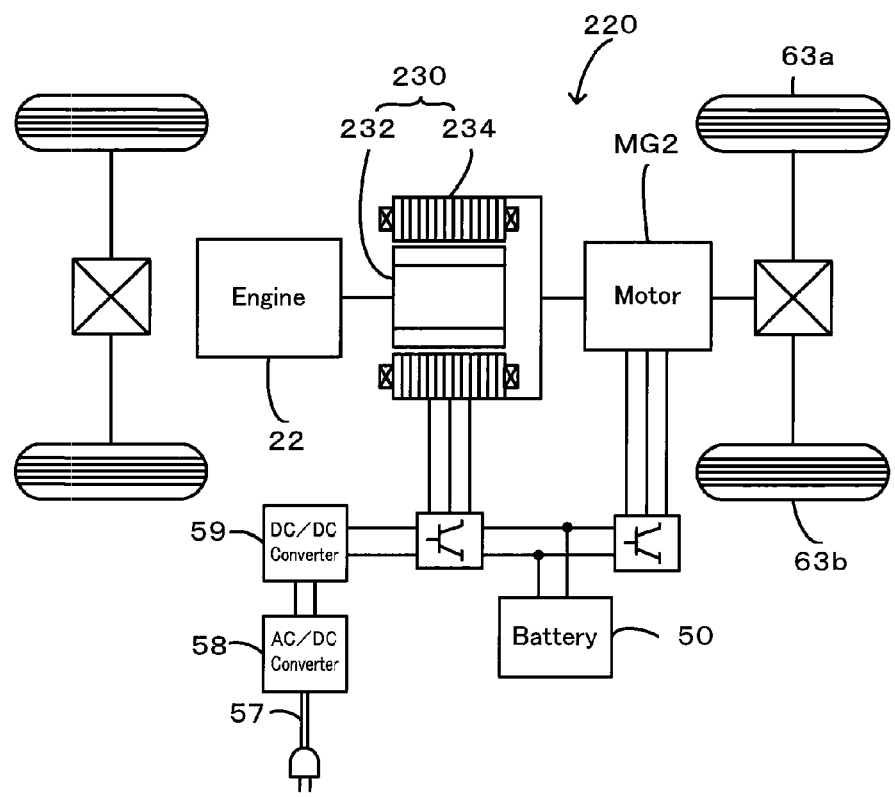
FIG. 6 schematically illustrates the configuration of still another hybrid vehicle 220 in another modified example.
Figure 7:
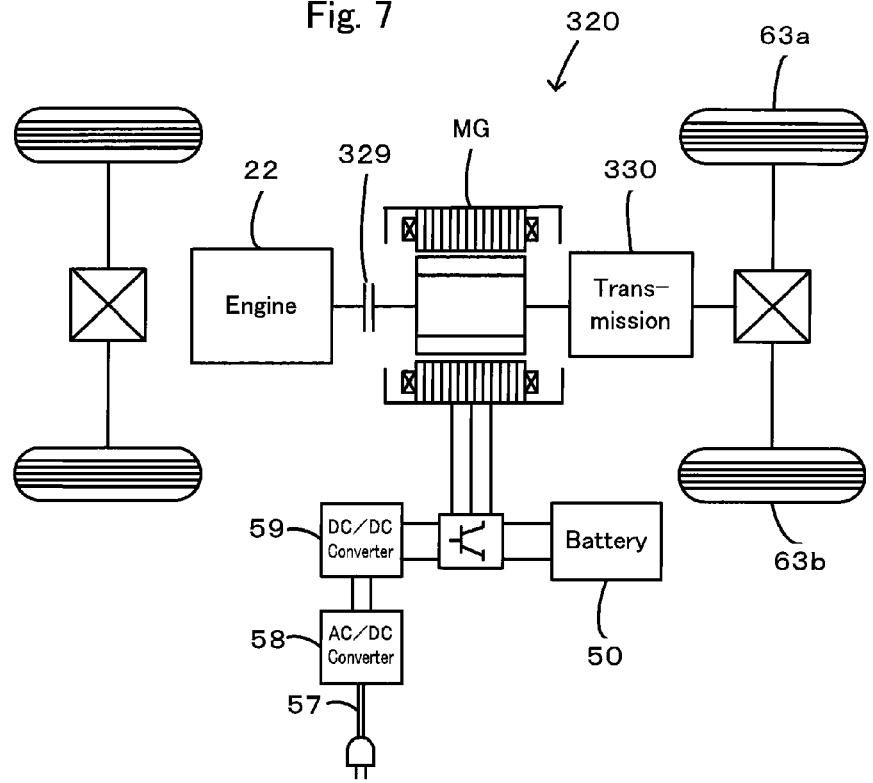
FIG. 7 schematically illustrates the configuration of another hybrid vehicle 320 in still another modified example.
Figure 8:
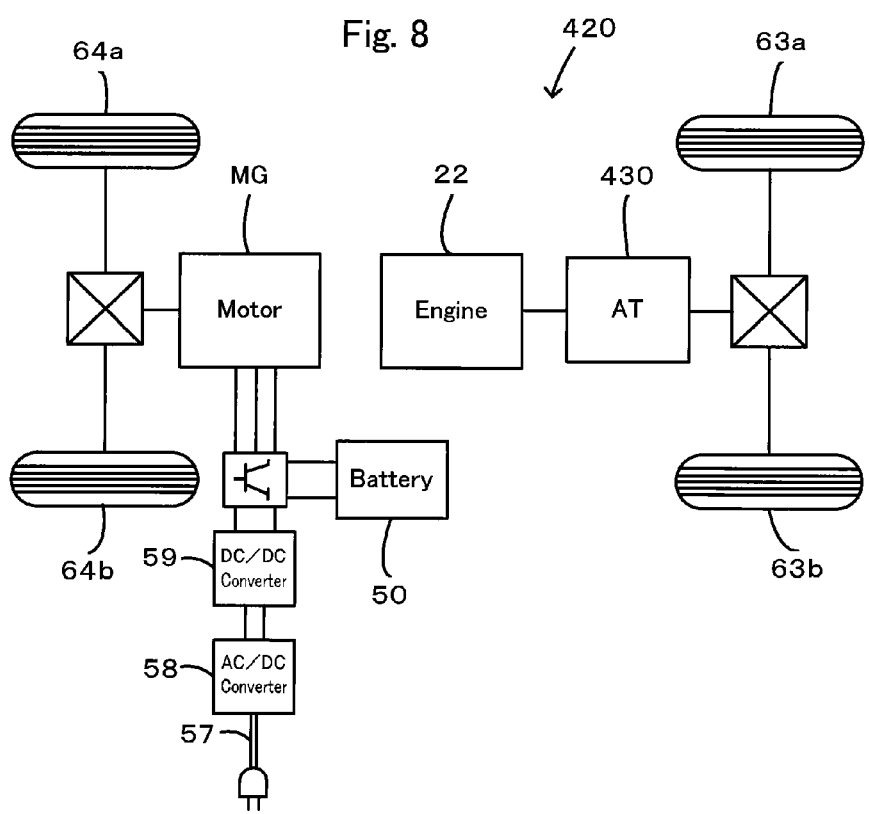
FIG. 8 schematically illustrates the configuration of another hybrid vehicle 420 in one modified example.

In the hybrid vehicle 20 of the embodiment, the engine 22, the planetary gear 30 connected to the crankshaft 26 of the engine 22 and the ring gear shaft 32a functioning as the driveshaft, the motor MG1 connected to the sun gear 31 of the planetary gear 30, and the motor MG2 attached via the reduction gear 35 to the ring gear shaft 32a are included. The technique of the invention is also applicable to a hybrid vehicle 120 of a modified structure shown in FIG. 5. In the hybrid vehicle 120 of FIG. 5, the power of the motor MG2 is output to another axle (an axle linked with wheels 64a and 64b) that is different from the axle connecting with the ring gear shaft 32a (the axle linked with the drive wheels 63a and 63b). The technique of the invention is also applicable to a hybrid vehicle 220 of another modified structure shown in FIG. 6. The hybrid vehicle 220 of FIG. 6 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power. The technique of the invention is also applicable to a hybrid vehicle 320 of a modified structure shown in FIG. 7. In the hybrid vehicle 320 of FIG. 7, the motor MG is attached via a transmission 330 to a driveshaft linked to the driving wheels 63a and 63b and the engine 22 is connected via a clutch 329 to the rotating shaft of the motor MG. In this hybrid vehicle 320, the power from the engine 22 is output to the driveshaft via the rotating shaft of the motor MG and the transmission 330, and the power from the motor MG is output via the transmission 330 to the driveshaft. The technique of the invention is also applicable to a hybrid vehicle 420 of a modified structure shown in FIG. 8. In the hybrid vehicle 420 of FIG. 8, the power from the engine 22 is output via a transmission 430 to the axle linked with the driving wheels 63a and 63b, and the power from the motor MG is output to another axle (an axle linked with wheels 64a and 64b of FIG. 8) that is different from the axle linked with the driving wheels 63a and 63b.

In the above embodiment, the invention is described using an application to a hybrid vehicle. The invention may be applied to an electric vehicle that is equipped with a motor constructed to output power for driving the vehicle but is not equipped with an engine. The invention may also be applied to a control method of such a motor vehicle.

The primary elements in the embodiment and its modified examples are mapped to the primary constituents in the claims of the invention as described below. The battery 50 in the embodiment corresponds to the 'secondary battery' in the claims of the invention. The motor MG2 in the embodiment corresponds to the 'motor' in the claims of the invention. The air conditioner 90 in the embodiment corresponds to the 'vehicle-mounted equipment' in the claims of the invention. The charger 56 in the embodiment corresponds to the 'external power supplying unit' in the claims of the invention. The voltage sensor 51a in the embodiment corresponds to the 'voltage detection unit' in the claims of the invention. The hybrid electronic control unit 70 executing the auxiliary drive time power supply control routine of FIG. 2 corresponds to the 'control unit' in the claims of the invention. In the auxiliary drive time power supply control routine of FIG. 2, in the case that an auxiliary such as the air conditioner 90 is operated with electric power from the commercial power supply by controlling the charger 56 prior to the system startup and the inter-terminal voltage (battery voltage) Vb of the battery 50 is more than or equal to the threshold value Vref that is a voltage where there is a possibility of overcharging the battery 50 when the battery 50 is charged, the supply voltage V* of the electric power supplied to the power lines 54 from the charger 56 is set to the voltage V2 that is a little smaller than the threshold value Vref and the charger 56 is controlled to drive the auxiliary with the electric power from the battery 50 and the electric power from the charger 56. In the routine of FIG. 2, in the case the auxiliary such as the air conditioner 90 is operated with the electric power from the charger 56 prior to the system startup and the battery voltage Vb is less than threshold value Vref, the supply voltage V* of the electric power supplied to the power lines 54 from the charger 56 is set to the voltage V1 that is more than or equal to the threshold value Vref and the charger 56 is controlled to drive the auxiliary together with charging the battery 50 with the electric power from the charger 56. The motor MG1 in the embodiment corresponds to the 'generator' in the claims of the invention. The planetary gear 30 in the embodiment corresponds to the 'three shaft-type power input output structure' in the claims of the invention.

The 'secondary battery' is not restricted to the battery 50 constructed as a lithium-ion secondary battery but may be any other type such as a nickel metal hydride secondary battery, a nickel cadmium secondary battery, and a lead acid secondary battery. The 'motor' is not restricted to the motor MG2 constructed as a synchronous motor generator but may be any other type of motor constructed to input and output power to a driveshaft, for example, an induction motor. The 'vehicle-mounted equipment' is not restricted to the air conditioner 90 but may be any other equipment that is connected with the battery power lines where the secondary battery is connected and consumes electric power. The 'external power supplying unit' is not restricted to the charger 56 but may be any other unit that is connected to an external power supply and is capable of supplying electric power from the external power supply to the battery power lines. The 'voltage detection unit' is not restricted to the voltage sensor 51a but may be any other unit that detects an inter-terminal voltage of the secondary battery. The 'control unit' is not restricted to the arrangement that, in the case that an auxiliary such as the air conditioner 90 is operated with electric power from the commercial power supply by controlling the charger 56 prior to the system startup and the inter-terminal voltage (battery voltage) Vb of the battery 50 is more than or equal to the threshold value Vref that is a voltage where there is a possibility of overcharging the battery 50 when the battery 50 is charged, the supply voltage V* of the electric power supplied to the power lines 54 from the charger 56 is set to the voltage V2 that is a little smaller than the threshold value Vref and the charger 56 is controlled to drive the auxiliary with the electric power from the battery 50 and the electric power from the charger 56. In this arrangement, in the case the auxiliary such as the air conditioner 90 is operated with the electric power from the charger 56 prior to the system startup and the battery voltage Vb is less than threshold value Vref, the supply voltage V* of the electric power supplied to the power lines 54 from the charger 56 is set to the voltage V1 that is more than or equal to the threshold value Vref and the charger 56 is controlled to drive the auxiliary together with charging the battery 50 with the electric power from the charger 56. The 'control unit' may be any other arrangement of, controlling the external power supplying unit, in a case that the detected inter-terminal voltage of the secondary battery is more than or equal to a predetermined voltage when the vehicle-mounted equipment is operated in a state that the external power supplying unit is connected to the external power supply, so that the vehicle-mounted equipment operates with electric power discharged from the secondary battery and electric power supplied by the external power supplying unit. As one example of the arrangement, in the case that the auxiliary such as the air conditioner 90 is operated with the electric power from the charger 56 prior to the system startup and the battery voltage Vb is less than the threshold value Vref, the operation of the auxiliary may be stopped to prioritize charge of the battery 50, or the auxiliary may be operated without charging the battery 50.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the motor vehicles.

The invention claimed is:

1. A motor vehicle, having a secondary battery that is mounted on the vehicle, a motor that is connected with battery power lines where the secondary battery is connected and constructed to input and output power for driving the vehicle, and a vehicle-mounted equipment that is connected with the battery power lines, the motor vehicle comprising:

an external power supplying unit that is connected to an external power supply and capable of supplying electric power from the external power supply to the battery power lines;

a voltage detection unit that detects an inter-terminal voltage of the secondary battery; and a control unit that controls the external power supplying unit, in a case that the detected inter-terminal voltage of the secondary battery is more than or equal to a predetermined voltage when the vehicle-mounted equipment is operated in a state that the external power supplying unit is connected to the external power supply, so that the vehicle-mounted equipment operates with electric power discharged from the secondary battery and electric power supplied by the external power supplying unit, wherein the control unit controls the external power supplying unit, in a case that the detected inter-terminal voltage of the secondary battery is less than the predetermined voltage when the vehicle-mounted equipment is operated in the state that the external power supplying unit is connected to the external power supply, so that the secondary battery is charged and the vehicle-mounted equipment operates with the electric power supplied by the external power supplying unit, and wherein the control unit controls the external power supplying unit, in the case that the detected inter-terminal voltage of the secondary battery is more than or equal to the predetermined voltage when the vehicle-mounted equipment is operated in the state that the external power supplying unit is connected to the external power supply, so that a voltage of electric power supplied to the battery power lines becomes a voltage less than the predetermined voltage, while the control unit controlling the external power supplying unit, in the case that the detected inter-terminal voltage of the secondary battery is less than the predetermined voltage when the vehicle-mounted equipment is operated in the state that the external power supplying unit is connected to the external power supply, so that the voltage of the electric power supplied to the battery power lines becomes a voltage more than or equal to the predetermined voltage.

2. The motor vehicle in accordance with claim 1, wherein the predetermined voltage is predetermined as a voltage where there is a possibility of overcharging the secondary battery.

3. The motor vehicle in accordance with claim 1, wherein the vehicle-mounted equipment is an air conditioner that performs air conditioning of a cabin.

4. The motor vehicle in accordance with claim 1, wherein the vehicle-mounted equipment is operated upon setting of an operating condition, and the control unit controls the vehicle-mounted equipment not to exceed the set operating condition.

5. The motor vehicle in accordance with claim 1, wherein the motor vehicle further comprising:

a generator that is connected with the battery power lines and constructed to input and output power; and a three shaft-type power input output structure that is connected to three shafts, a driveshaft linked to an axle of the motor vehicle, an output shaft of an internal combustion engine, and a rotating shaft of the generator, and designed to input and output power to residual shaft based on powers input from and output to any two shafts among the three shafts, wherein the motor is so connected with the driveshaft as to input and output power from and to the driveshaft.

6. A control method of a motor vehicle having a secondary battery that is mounted on the vehicle, a motor that is connected with battery power lines where the secondary battery is connected and constructed to input and output power for driving the vehicle, a vehicle-mounted equipment that is connected with the battery power lines, and an external power supplying unit that is connected to an external power supply and capable of supplying electric power from the external power supply to the battery power lines, the control method comprising:

controlling the external power supplying unit, in a case that an inter-terminal voltage of the secondary battery is more than or equal to a predetermined voltage when the vehicle-mounted equipment is operated in a state that the external power supplying unit is connected to the external power supply, so that the vehicle-mounted equipment operates with electric power discharged from the secondary battery and electric power supplied by the external power supplying unit, wherein the control unit controls the external power supplying unit, in a case that the detected inter-terminal voltage of the secondary battery is less than the predetermined voltage when the vehicle-mounted equipment is operated in the state that the external power supplying unit is connected to the external power supply, so that the secondary battery is charged and the vehicle-mounted equipment operates with the electric power supplied by the external power supplying unit, and wherein the control unit controls the external power supplying unit, in the case that the detected inter-terminal voltage of the secondary battery is more than or equal to the predetermined voltage when the vehicle-mounted equipment is operated in the state that the external power supplying unit is connected to the external power supply, so that a voltage of electric power supplied to the battery power lines becomes a voltage less than the predetermined voltage, while the control unit controlling the external power supplying unit, in the case that the detected inter-terminal voltage of the secondary battery is less than the predetermined voltage when the vehicle-mounted equipment is operated in the state that the external power supplying unit is connected to the external power supply, so that the voltage of the electric power supplied to the battery power lines becomes a voltage more than or equal to the predetermined voltage.

7. The control method of the motor vehicle in accordance with claim 6, the control method controlling the external power supplying unit, in a case that the inter-terminal voltage of the secondary battery is less than the predetermined voltage when the vehicle-mounted equipment is operated in the state that the external power supplying unit is connected to the external power supply, so that the secondary battery is charged and the vehicle-mounted equipment operates with the electric power supplied by the external power supplying unit.

* * * * *